United States Patent
Vestberg et al.

(10) Patent No.: US 7,038,000 B2
(45) Date of Patent: May 2, 2006

(54) PROCESS FOR PREPARING PROPYLENE COPOLYMERS

(75) Inventors: Torvald Vestberg, Porvoo (FI); Pirjo Jaaskelainen, Porvoo (FI); Paivi Pitkanen, Halkia (FI); Kauno Alastalo, Porvoo (FI)

(73) Assignee: Borealis Technology OY, Porvoo (FI)

( * ) Notice: Subject to any disclaimer, the term of this patent is extended or adjusted under 35 U.S.C. 154(b) by 0 days.

(21) Appl. No.: 10/476,626

(22) PCT Filed: May 3, 2002

(86) PCT No.: PCT/GB02/02064

§ 371 (c)(1),
(2), (4) Date: Dec. 1, 2003

(87) PCT Pub. No.: WO02/090400

PCT Pub. Date: Nov. 14, 2002

(65) Prior Publication Data

US 2004/0176551 A1    Sep. 9, 2004

(30) Foreign Application Priority Data

May 4, 2001    (GB) .................................... 0111020

(51) Int. Cl.
*C08F 110/06* (2006.01)

(52) U.S. Cl. ................ 526/351; 526/124.1; 526/124.2; 526/124.3; 526/348.2; 526/335; 526/336

(58) Field of Classification Search ............. 526/124.1, 526/124.2, 124.3, 351, 348.2, 335, 336
See application file for complete search history.

(56) References Cited

U.S. PATENT DOCUMENTS 4,297,465 A    10/1981   Smith
6,084,041 A *  7/2000   Andtsjo et al.

FOREIGN PATENT DOCUMENTS

| DE | 41 30 299 A1 | 3/1993 |
| WO | 97/13790 | 4/1997 |
| WO | 98/58976 | 12/1998 |
| WO | WO 98/58976 | * 12/1998 |
| WO | 99/29742 | 6/1999 |

* cited by examiner

*Primary Examiner*—Ling-Sui Choi
(74) *Attorney, Agent, or Firm*—Nixon & Vanderhye

(57) ABSTRACT

There is provided a process for the copolymerisation of propylene with at least one $C_{4-20}$ α-olefin or $C_{4-20}$ diene in a reaction medium in the presence of a catalyst system at a temperature of greater that 80° C. or at a temperature and pressure above the critical temperature and pressure of the reaction medium. Under such conditions, comonmer incorporation is higher than under standard conditions.

9 Claims, 1 Drawing Sheet

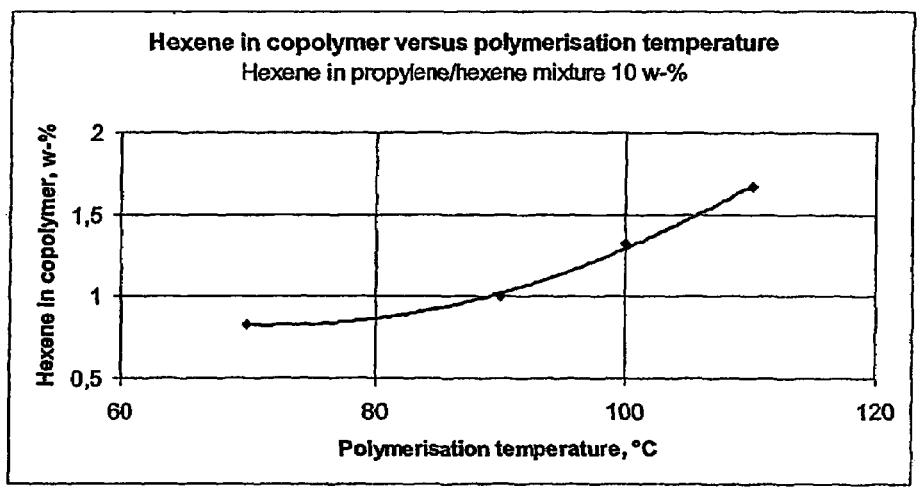
Figure 1. Effect of temperature on incorporation of 1-hexene in to the copolymer. Examples 2, 5, 6 and comparative example 4

PROCESS FOR PREPARING PROPYLENE COPOLYMERS

This invention relates to a process for making propylene copolymers, in particular to a process for making propylene copolymers with higher olefins at high temperatures, e.g. temperatures approaching the critical temperature of the reaction medium.

The polymerisation of propylene and comonomers in a loop reactor is a well known process. Typically, polymer is formed as solid particles suspended in a liquid comprising mainly propylene monomer. The reactor content is maintained in a highly agitated state by circulating the reaction mixture at comparatively high velocity around the loop by means of a pump. The heat of polymerisation is removed by a cooling jacket enclosing the reactor and polymer is removed from the reactor continuously or discontinuously.

There are however some problems associated with conventional loop reactor polymerizations. Firstly, the reactor temperature and pressure must be such that the entire reactor is completely filled with the reaction mixture and no vapour bubbles are present. Secondly, the reaction medium needs to be carefully selected to ensure minimum polymer solubility, a particular problem with copolymers. Finally, the reaction medium must also be volatile to allow its easy separation from the finished polymer powder.

There are also problems associated with the manufacture of propylene copolymers with higher olefins since comonomer incorporation of higher olefins is low.

It is well-known in the art that higher olefins, e.g. hexene or diene olefins, polymerise much more slowly than lower alpha olefins such as ethylene and propylene. Hence, in order to get a desired amount of higher olefin into a copolymer a considerable excess of higher olefin is required. Since only a very limited amount of the higher olefin actually reacts during the polymerisation, the residual unreacted monomers need to be removed, and separated from the other monomers and polymer products which is clearly an expensive, undesirable and technically challenging process, especially when large amounts of monomer need to be separated. Moreover, any unreacted monomers remaining in the final polymer product cause undesirable odour and taste and may pose a health hazard.

In order to alleviate some of the problems with loop reactor polymerisation discussed above, EP-A-854887 suggests the use of supercritical conditions under which to carry out propylene homo or copolymerisation especially with ethylene. By supercritical conditions it is meant that both the temperature and the pressure within the reactor are above the corresponding critical temperature and the critical pressure of the reaction medium (normally mainly propylene).

BRIEF DESCRIPTION OF THE DRAWINGS

FIG. 1 is a graph showing the effective temperature on incorporation of 1-hexene into the polymer. Examples 2, 5, 6 and Comparative Example 4 provide the data points for this graph.

The applicant has surprisingly found that by copolymerising propylene with higher olefins at high temperature, for example, under supercritical conditions, the incorporation of higher olefin into a polymer is greater and hence there is less unreacted higher olefin remaining after polymerisation has been completed, hence less higher olefin needs to be removed in the process, separated and recirculated. As used herein, higher olefins include diene olefins and α-olefins having at least 4 carbon atoms. Moreover, due to the higher incorporation of higher olefins observed at high temperature or under supercritical conditions, less starting higher olefin is required giving rise to considerable economic savings.

In addition, by using higher temperature, any unreacted higher olefin may be more easily removed from the reactor since little additional heat is required to evaporate the higher olefin monomer.

Thus, viewed from one aspect the invention provides a process for the copolymerisation of propylene with at least one $C_{4-20}$ α-olefin or $C_{4-20}$ diene olefin in a reaction medium in the presence of a catalyst system at a temperature of greater than 80° C. The copolymerisation preferably takes place as a slurry or bulk polymerisation, preferably in a loop reactor.

Viewed from another aspect the invention provides a propylene copolymer with a $C_{4-20}$ α-olefin or $C_{4-20}$ diene olefin obtained by a process as hereinbefore described.

The process of the invention requires operation at a temperature of greater than 80° C., preferably at least 85° C. Alternatively, the process of the invention may be operated under supercritical conditions. This latter condition means that the temperature in the reactor must be higher than the corresponding critical temperature of the reaction mixture and the pressure in the reactor higher than the corresponding critical pressure of the reaction mixture.

The reaction medium is formed from the propylene and comonomers present as well as any hydrogen or other adjuvant employed.

In a process for the manufacture of propylene copolymers as described in the present invention, the major part of the reaction medium will be formed by propylene. The critical temperature and pressure of propylene would be 91.4° C. and 46 bars. Hence, in order to carry out a polymerisation under supercritical conditions where propylene formed the totality of the reaction medium, the temperature must exceed approximately 92° C. and the pressure must exceed 46 bars.

However, in the present invention at least one higher olefin (i.e. a $C_{4-20}$ α-olefin or $C_{4-20}$ diene olefin) must be present. The presence of such a higher olefin which by definition has a higher boiling point than propylene means that the critical temperature of the reaction medium increases. The size of the increase is, of course, dependent on the nature of the comonomer and the amount present in the reactor. The temperature and pressure conditions required to ensure that the reaction takes place under supercritical conditions will be readily determined by the skilled chemical engineer.

In the process of the invention, the reactor temperature must be greater than 80° C., preferably at least 85° C., more preferably at least 90° C., especially at least 100° C., e.g. 100 to 110° C. At such high polymerisation temperatures (i.e. temperatures greater than 80° C.) incorporation of higher olefin into a copolymer is higher than under conventional lower temperature polymerisation conditions, e.g those at less than 80° C., typically 50 to 75° C.

The ultimate upper limit of the temperature within the reactor in any situation is the melting point of the resulting copolymer but unnecessarily high temperatures also cause an increase in the solubility of the polymer which is undesirable. The preferred temperature range is therefore between 90 to 105° C.

Where supercritical temperatures are employed, these are preferably in the range of 92 to 120° C., particularly 92 to 110° C., especially 92 to 100° C. Preferably, supercritical pressure ranges are from 46 to 100 bars, preferably 50 to 70 bars when the reaction medium comprises mainly propylene. But as discussed in detail above, the critical temperature and pressure of a reaction medium depend not only on the propylene present but also on the amount of higher olefins used.

Under non-supercritical conditions, the pressure within the reactor vessel may be in the range 30 to 60 bars, e.g. 35 to 55 bars. The pressure is controlled to ensure that the reaction mixture is maintained in a liquid state.

In general, the temperature and pressure conditions required for the process of the invention can be summarised as follows:

1. Temperature>80° C., preferably>85° C., more preferably>90° C. but less than $T_c$ when the pressure in the reactor is greater or less than the supercritical pressure of the reaction mixture.
2. $T>T_c$ when pressure sufficient to maintain the mixture in a liquid state.
3. Supercritical conditions, i.e. both temperature and pressure being greater than $T_c$ and $p_c$ respectively.

Where large amounts of higher olefin comonomer are present, the critical temperature of the reaction medium may be so high that it exceeds the melting temperature of the polymer product or the solubility of the polymer product becomes unacceptably high. In such a scenario, it may therefore be necessary to adjust the critical temperature of the reaction medium by adding adjuvants to the reactor. Suitable adjuvants are those of low molecular weight that when added to the reaction medium inevitably cause the critical temperature of the medium to fall. Preferred adjuvants are methane and ethane. The addition of these adjuvants can decrease the critical temperature of the reaction medium down to levels suitable for the polymerisation in question.

The critical temperature and pressure of methane is −82.1° C. and 45.8 atm. The corresponding values for ethane are 32.3° C. and 48.2 atm. These components can be added to the reaction medium in amounts of up to 20% by weight and can reduce the critical temperature of the reaction medium to well below 90° C.

Physical properties of the reaction mixture such as the critical point can be calculated by using the equation of state. Some examples of these equations are SRK (Soave-Redlich-Kwong) and Peng-Robinson (The introduction to Aspen plus, course notes, May 2000, Aspen Technology, Inc. page 86).

The skilled person will also realise that certain catalysts operate more efficiently at less than 90° C. and hence reduction of temperature to improve catalyst performance may also be required. Conversely, if the temperature is too high, e.g. above 110° C., then the activity of the catalyst may decrease.

In the process of the invention, propylene needs to be copolymerised with a $C_{4-20}$ diene or a $C_{4-20}$ α-olefin, e.g. $C_{5-20}$ α-olefin, $C_{6-16}$ or $C_{4-16}$ α-olefin, preferably $C_{6-10}$ α-olefin. Suitable dienes are $C_{4-10}$ dienes, e.g. butadiene, 1,4-pentadiene or 1,5-hexadiene. Preferably, the comonomer should be a $C_{4-10}$ α-olefin, e.g. $C_{5-10}$ α-olefin, such as hexene, 4-methylpentene, heptene or octene. In an especially preferred embodiment, the comonomer is a $C_{6-8}$ linear α-olefin, especially hexene or octene.

The amount of higher olefin fed into the polymerisation process depends very much on the amount of the higher olefin desired in the polymer product. It is preferred however, if the higher olefin feed makes up no more than 30 wt %, e.g. no more than 20 wt % of the feed into the process relative to propylene. Preferably, the amount of higher olefin in the reaction medium should be up to 15 wt %, e.g. in the range from 1 to 15 wt %, especially up to 10 wt % relative to the amount of propylene employed. Even small changes in the amount of higher olefin fed into the polymerisation process can significantly affect the amount of higher olefin incorporated. Moreover, small changes in the amount of comonomer incorporated can have significant impact on polymer properties.

Hydrogen is usually employed to manipulate the molecular weight of the polymer product. The use of hydrogen in such manipulation is conventional in the art. Suitable amounts of hydrogen which may be added are 0.001 to 100 mol $H_2$/kmol propylene, preferably in the range 0.5 to 30 mol $H_2$/kmol propylene.

Under conventional polymerisation conditions, i.e. at a temperature less than 80° C., typically at 60 to 70° C., higher olefins do not copolymerise easily. The person skilled in the art knows that the copolymerisation rate is dependent on the nature of the higher olefin—the longer the monomer chain, the lower the copolymerisation rate. Thus, under such low temperature conditions, in order to obtain a propylene copolymer comprising, for example, 1% by weight of higher α-olefin, e.g. hexene, it is necessary to employ a considerable excess of hexene in the reaction medium. For example, when the Ziegler-Natta catalyst of EP-A-591224 is used in low temperature polymerisation at, for example, 70° C., in order to obtain 1% wt hexene in a propylene copolymer you would require 12 wt % hexene in the reaction medium relative to propylene.

The use of higher polymerisation temperatures or supercritical polymerisation conditions may allow more higher olefin to be copolymerised into a polymer than under lower temperature conditions.

Thus, for example, in order to incorporate 1 wt % of hexene into a polymer at 90° C. would require only 10 wt % of hexene in the feed. Further, by using supercritical conditions only 5.9 wt % of hexene would be required in the reaction mixture. Thus, at least 20% more hexene is copolymerised into the polymer when higher temperature polymerisation conditions are used. The same kind of behaviour is observed for other higher olefins and for octene, the difference is even more marked.

On an industrial scale such significant increases in higher olefin incorporation give rise to significant economic savings for a number of reasons. Firstly, less higher olefin needs to be employed in the reaction medium to obtain the same amount of comonomer in the polymer as under low temperature subcritical conditions. Secondly, since incorporation of higher olefin is higher, less unreacted comonomer remains in the outlet stream to be removed from the reaction mixture. For obvious economic and environmental reasons, unreacted monomer needs to be carefully removed from the process and obtained polymer and reisolated for future use. Any reduction in the amount of comonomer present simplifies the monomer separation and recycling process again allowing the polymer manufacturer to make significant economic savings. Additionally, by using higher reactor temperatures, residual comonomer may be more easily removed from the reactor since little heat is required to cause evaporation of the comonomer.

Moreover, since the process of the invention gives rise to polymers having less residual higher olefin monomer, the taste and odour of the produced polymers is improved.

The catalyst to be employed in the present invention may be any kind of catalyst suitable for use in olefin polymerisations but usually is a conventional Ziegler-Natta catalyst system which is well-known in the art. A typical Ziegler-Natta catalyst system used in the invention is a highly stereospecific catalyst system comprising a catalyst component (procatalyst), a cocatalyst component and an external donor, the catalyst component containing as essential elements magnesium, titanium and halogen. The procatalyst may therefore comprise a titanium halogenide compound on a magnesium chloride compound. A typical cocatalyst is a $C_{1-10}$ aluminum alkyl. The catalyst system should additionally include electron donor compounds such as ethers, esters, silanes and the like. The use of such donors is of course routine. Conventional carrier materials such as $MgCl_2$ and silica may also be employed.

Catalysts of use in the invention can be prepared as described in, for example, EP-A-491566, EP-A-627449, EP-A-889915, EP-A-926165, EP-A-591224, EP-A-586390, WO00/68277 and U.S. Pat. No. 5,234,879 all of which are incorporated herein by reference.

It is important that the catalyst employed works efficiently at the higher reactor temperatures/supercritical temperature of the present invention. Some conventional Ziegler-Natta species for isotactic polymerisation generally have an operating temperature of around 80° C. above which they lose activity and/or stereoselectivity. Whilst such catalysts can of course be employed if adjuvants are used to reduce the supercritical temperature within the reactor it is preferred if the employed catalyst operates fully at the preferred reactor temperature.

In this regard an especially preferred catalyst is described in EP-A-591224 or EP-A-491566. In both these applications there is described a method for preparing a procatalyst composition from magnesium dichloride, a titanium compound, a lower alcohol and an ester of phthalic acid. In order to produce the catalyst species, a transesterification reaction is carried out between the alcohol and phthalic acid ester to give a particularly advantageous Ziegler-Natta catalyst.

Generally, the quantity of catalyst used will depend upon the nature of the catalyst, the reactor types and conditions and the properties desired for the polymer product. Conventional catalyst quantities, such as described in the publications referred to herein, may be used.

Whilst the process of the invention is primarily for use in the preparation of propylene polymers with a single other higher olefin, it is also within the scope of the present application to prepare terpolymers, i.e. polymers comprising propylene and at least two other higher olefins e.g. hexene and butene or terpolymers comprising propylene, ethylene and at least one higher olefin. The use of high reactor temperatures or supercritical conditions should increase the incorporation of all higher olefin species present again allowing economic savings to be made.

The polymerisation process of the invention should take place in suspension liquid slurry or bulk where the polymer forms as a particulate. Preferably, the process of the invention occurs in slurry-bulk where the reaction medium comprises mainly propylene. A conventional loop reactor or a continuous stirred tank reactor may form the slurry reactor. Both reactors are well-known in the art. In a preferred embodiment, the reactor should be a loop reactor, especially a loop reactor working in bulk.

The polymerisation may be carried out by feeding the catalyst system, a mixture of propylene, comonomer and optionally hydrogen and adjuvants into the reactor and circulating the mixture with a pump. Heat of polymerisation can be removed using a conventional cooling jacket.

The continuous stirred tank reactor or a loop reactor may form the only reactor used in the polymerisation process, however, it is preferred if further gas phase/loop or stirred tank reactors are also employed. Said further loop or stirred tank reactors can be operated at lower or higher temperature conditions.

In a particularly preferred embodiment two reactors are employed, the first reactor being a loop reactor operating under high temperature (greater than 80° C.)/supercritical conditions) and the second reactor being a conventional gas phase reactor. The reaction mixture can be transferred from the loop reactor to the gas phase reactor by conventional techniques using appropriate flashing methods etc or directly and gas phase polymerisation can be carried out at a temperature of for example, 60 to 100° C. at a pressure of, for example, 5 to 50 bars. The properties of the polymer produced can be manipulated using $H_2$ and/or comonomer as is known in the art.

It is also within the scope of the invention to employ a further gas phase reactor subsequent to the first gas phase reactor.

Another preferred reactor set up involves the use of two loop reactors. At least one of the reactors should be operated according to the invention, i.e. by employing high temperature polymerisation. It is also possible to run both reactors under the conditions required by the process of the invention.

In addition to the actual polymerisation reactors used for producing the propylene copolymer, the polymerisation reaction system can also include a number of additional reactors such as pre and/or post reactors. The pre-reactors include any reactor for prepolymerising the preactivated/modified catalyst with propylene and/or other olefin(s). The post-reactors include reactors used for modifying and improving the properties of the polymer product. All reactors in the reactor system are preferably arranged in series.

Using the process of the invention it is possible to prepare propylene copolymers having wide ranging properties. The molecular weight, melt flow index, crystallinity, melting point and melt range of the polymers can be readily adjusted. The polymer may also have improved mechanical properties such as flexural modulus and elasticity and are normally produced in particle form.

The copolymers produced by the process of the invention have applications in a wide variety of areas, e.g. pipe, film, sheet, fibre, mouldings, wire and cable.

The invention will now be described with reference to the following non-limiting examples and Figure, which shows hexene incorporation in copolymer versus polymerisation temperature results for Examples 2, 5 and 6 and comparative example 4.

Experimental Methods

The following procedures were used to determine polymer parameters.

MFR $MFR_2$:ISO 1133 Standard, at 230° C., using 2.16 kg load

Xylene Soluble Fraction

XS: Determination of xylene soluble fraction (XS): 2.0 g of polymer is dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks.

The solution from the first 100 ml vessel is evaporated in nitrogen flow and the residue is dried under vacuum at 90° C. until constant weight is reached.

The xylene soluble fraction is calculated using the following equation:

$$XS\% = (100 \times m_1 \times v_o)/(m_o \times V_1),$$

wherein $m_o$ = initial polymer amount (g)
$m_1$ = weight of residue (g)
$v_0$ = initial volume (ml)
$v_1$ = volume of analysed sample (ml)

Thermal Properties

Melting temperature, Tm, crystallisation temperature, $T_{cr}$, and the degree of crystallinity were measured with Mettler TA820 differential scanning calorimetry (DSC) on 3±0.5 mg samples. Both crystallisation and melting curves were obtained during 10° C./min cooling and heating scans between 30° C. and 225° C. Melting and crystallisation temperatures were taken as the peaks of endotherms and exotherms. The degree of crystallinity was calculated by comparison with heat of fusion of a perfectly crystalline polypropylene, i.e. 209 J/g.

EXAMPLE 1

All raw materials were essentially free from water and air and all material additions to the reactor and the different steps were done under inert conditions.

The polymerisation was carried out in a 5 litre reactor, which was heated, vacuumised and purged with nitrogen. 78 μl TEA (triethyl aluminium), 13 μl donor D (dicyclopentyldimethoxy silane) and 30 ml pentane were mixed and allowed to react for 5 minutes. Half of the mixture was added to the reactor and the other half was mixed with 5.2 mg highly active and stereospecific Ziegler Natta catalyst (ZN catalyst). The ZN catalyst was prepared according to the catalyst synthesis of EP-A-591224, and had Ti content 2.1 wt %. After about 10 minutes the ZN catalyst/TEA/donor D/pentane mixture was added to the reactor. The Al/Ti molar ratio was 250 and the Al/Donor molar ratio was 10. 140 mmol hydrogen, 50 g 1-hexene and 950 g propylene were added to the reactor and the temperature was raised to 102° C. over 26 minutes. The pressure in the reactor was 50 bars. The reaction was stopped after 1 hour at 102° C. by flashing out unreacted propylene and 1-hexene. 2-propanol (5 ml) was added after flashing in order to kill the catalyst and prevent further polymerisation of any residual 1-hexene. Finally, the polymer powder was dried in the reactor at 50° C. with nitrogen purge for 1.5 hours.

The polymer was analysed and the results are shown in table 1 below. The hexene content in the polymer was 0.85 wt %.

COMPARATIVE EXAMPLE 1

This example was carried out as described in example 1, with the exception that the polymerisation temperature was 80° C., and the polymerisation pressure was 37 bars. The concentrations of propylene, 1-hexene and hydrogen in the liquid phase are approximately the same as in Example 1. The details and results are shown in table 1. The hexene content in the polymer was only 0.65 wt %.

EXAMPLE 2

This example was carried out as described in example 1 with the exception that the amount of 1-hexene was doubled and the polymerisation temperature was 110° C. The details and results are shown in table 1. The hexene content in the polymer was 1.67 wt %.

TABLE 1

Polymerisation conditions and polymer properties

| | | Ex 1 | Comp Ex 1 | Ex 2 |
|---|---|---|---|---|
| Conditions | | | | |
| Temperature | ° C. | 102 | 80 | 110 |
| Propylene | g | 950 | 1330 | 900 |
| 1-hexene | g | 50 | 73 | 100 |
| Hexene in liquid | wt % | 5 | ~5.7 | 10 |
| Hydrogen | mmol | 140 | 250 | 180 |
| Hydrogen in liquid | mol-% | 0.6 | ~0.6 | ~0.8 |
| Pressure | bar | 50 | 37 | 50 |
| Yield | g | 241 | 318 | 242 |
| Activity | kgPP/gcat | 46 | 43 | 33 |
| Polymer Properties | | | | |
| MFR | g/10 min | 8.5 | 6.3 | 17.3 |
| XS | wt % | 1.3 | 1.5 | 1.5 |
| Hexene | Wt % | 0.85 | 0.65 | 1.67 |
| Tm | ° C. | 156.1 | 157.8 | 151.6 |
| Tcr | ° C. | 118.3 | 118.1 | 112.9 |
| Crystallinity | % | 47 | 49 | 41 |

It is clear from the examples that the amount of hexene incorporated into a polymer is greater when the polymerisation takes place at temperatures greater than 80° C. (Ex 1 and 2) than at lower temperature (Comp. Ex 1) even though under the higher temperature conditions less hexene was fed into the process.

EXAMPLE 3

This example was carried in accordance with Example 1 with the exception that 1-octene was used as comonomer and the polymerization temperature was 100° C. The 1-octene content in the liquid was 2.5 wt. %. The details and results are shown in table 2. The 1-octene content in the polymer was 0.55 wt. %.

COMPARATIVE EXAMPLE 2

This example was carried out as described in Example 3, with the exception that the temperature was 80° C. The details and results are shown in table 2. The 1-octene content in the polymer was 0.27 wt. %.

EXAMPLE 4

This example was carried described in Example 3, with the exception that the amount of 1-octene was doubled and the polymerisation temperature was 102–105° C. The details and results are shown in table 2. The 1-octene content in the polymer was 0.97 wt. %.

COMPARATIVE EXAMPLE 3

This example was carried out as described in Example 4, with the exception that the polymerisation temperature was 80° C. The details and results are shown in table 2. The 1-octene content in the polymer was 0.31 wt. %.

TABLE 2

Conditions and polymer properties with 1-octene

|  |  | Example 3 | Comp Ex 2 | Example 4 | Comp Ex 3 |
|---|---|---|---|---|---|
| Conditions |  |  |  |  |  |
| Temperature | ° C. | 100 | 80 | 102–105 | 80 |
| Pressure | bar | 51–50 | ~39 | ~51.5 | ~38 |
| Propylene | g | 1100 | 1360 | 1100 | 1330 |
| Octene | g | 28 | 32 | 53 | 63 |
| Octene in liquid | wt % | 2.5 | ~2.5 | 4.6 | ~5 |
| Hydrogen | mmol | 159 | 250 | 146 | 250 |
| Hydrogen in liquid | mol-% | 0.6 | ~0.6 | 0.55 | ~0.6 |
| Yield | g | 302 | 292 | 309 | 319 |
| Activity (bulk) | kgPP/gcath | 51.2 | 42.3 | 44.1 | 44.9 |
| Polymer Properties |  |  |  |  |  |
| MFR | g/10 min | 9.2 | 7.4 | 12.5 | 7.3 |
| XS | wt % | 1.1 | 1.3 | 1.2 | 1.4 |
| Octene | wt % | 0.55 | 0.27 | 0.97 | 0.31 |
| Tm | ° C. | 157.9 | 162.4 | 155.8 | 159.2 |
| Tcr | ° C. | 115.9 | 116.5 | 113.8 | 116.5 |
| Crystallinity | % | 50 | 51 | 46 | 50 |

EXAMPLE 5

This example was carried as described in Example 1, with the exception that the amount of 1-hexene was doubled, corresponding to about 10 wt. % in the liquid phase. The polymerisation temperature was 90° C. The details and results are shown in table 3. The 1-hexene content in the polymer was 1.0 wt. %.

EXAMPLE 6

This example was carried out as described in Example 5, with the exception that the polymerisation temperature was 100° C. The details and results are shown in table 3. The 1-hexene content in the polymer was 1.32 wt. %.

COMPARATIVE EXAMPLE 4

This example was carried out as described in Example 5, with the exception that the polymerisation temperature was 70° C. The details and results are shown in table 3. The 1-hexene content in the polymer was 0.83 wt. %.

TABLE 3

Conditions and properties for 1-hexene with 10 wt. % 1-hexene in the liquid

|  |  | Comp Ex 4 | Example 5 | Example 6 |
|---|---|---|---|---|
| Conditions |  |  |  |  |
| Temperature | ° C. | 70 | 90 | 100 |
| Pressure | bar | 31 | 41 | 46 |
| Propylene | g | 1270 | 1200 | 1100 |
| 1-hexene | g | 130 | 125 | 118 |
| 1-hexene in liquid | wt % | ~10 | ~10 | ~10 |
| Hydrogen | mmol | 300 | 210 | 160 |
| Hydrogen in liquid | mol-% | ~0.6 | ~0.6 | 0.6 |
| Yield | g | 204 | 319 | 306 |
| Activity (bulk) | kgPP/gcath | 24 | 53.2 | 54.6 |
| Polymer Properties |  |  |  |  |
| MFR | g/10 min | 14.9 | 9.8 | 13.3 |
| XS | wt % | 2 | 1.4 | 1.5 |
| 1-hexene | wt % | 0.83 | 1 | 1.32 |
| Tm | ° C. | 153.8 | 152.8 | 152.5 |
| Tcr | ° C. | 114.8 | 112.7 | 113.1 |
| Crystallinity | % | 47 | 45 | 44 |

The invention claimed is:

1. A single stage or a multistage process for the subcritical copolymerisation of propylene with a comonomer selected from 1-hexene, 1-octene or a $C_{4-20}$ diene olefin wherein the polymerisation is carried out in the presence of a Ziegler-Natta catalyst system, at least one stage is carried out at a temperature of greater than 80° C. and wherein all stages are carried out in a slurry reactor.

2. A process as claimed in claim 1 wherein said comonomer is 1-octene.

3. A process as claimed in claim 1 wherein said process takes place in bulk.

4. A process as claimed in claim 1 wherein said slurry reactor is a loop reactor or a stirred tank reactor.

5. A process as claimed in claim 1 wherein the copolymerisation takes place at a temperature of at least 85° C.

6. A process as claimed in claim 5 wherein the polymerisation operates at a temperature of at least 90° C.

7. A process as claimed in claim 6 wherein the polymerisation operates at a temperature of at least 100° C.

8. A process as claimed in claim 1 wherein the amount of 1-hexene, 1-octene or $C_{4-20}$ diene in the reaction medium is up to 15 wt %.

9. A process as claimed in claim 8 wherein the amount of 1-hexene, 1-octene or $C_{4-20}$ diene in the reaction medium is up to 10 wt %.

* * * * *